United States Patent
Guo et al.

(10) Patent No.: US 12,380,328 B2
(45) Date of Patent: Aug. 5, 2025

(54) LIGHTWEIGHT MODEL TRAINING METHOD, IMAGE PROCESSING METHOD, ELECTRONIC DEVICE, AND STORAGE MEDIUM

(71) Applicant: Beijing Baidu Netcom Science Technology Co., Ltd., Beijing (CN)

(72) Inventors: Ruoyu Guo, Beijing (CN); Yuning Du, Beijing (CN); Chenxia Li, Beijing (CN); Baohua Lai, Beijing (CN); Yanjun Ma, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 402 days.

(21) Appl. No.: 18/108,956

(22) Filed: Feb. 13, 2023

(65) Prior Publication Data
US 2024/0070454 A1    Feb. 29, 2024

(30) Foreign Application Priority Data
Aug. 30, 2022   (CN) .......................... 202211059602.5

(51) Int. Cl.
*G06N 3/08*     (2023.01)
*G06V 10/82*    (2022.01)

(52) U.S. Cl.
CPC .............. *G06N 3/08* (2013.01); *G06V 10/82* (2022.01)

(58) Field of Classification Search
CPC ........... G06N 3/04; G06N 3/045; G06N 3/08; G06N 3/082; G06N 3/084; G06V 10/7792; G06V 10/82
See application file for complete search history.

(56) References Cited

U.S. PATENT DOCUMENTS

2020/0311552 A1*  10/2020  A ........................... G06N 3/082
2022/0076136 A1*   3/2022  Passban ................. G06N 3/045
(Continued)

FOREIGN PATENT DOCUMENTS

CN    111242297 A    6/2020
CN    112966744 A    6/2021
(Continued)

OTHER PUBLICATIONS

Jaeyong Kang et al., "Ensemble Learning of Lightweight Deep Learning Models Using Knowledge Distillation for Image Classification," Sep. 24, 2020, Mathematics 2020,8,1652, pp. 1-10.*
(Continued)

*Primary Examiner* — Omar S Ismail
(74) *Attorney, Agent, or Firm* — Faegre Drinker Biddle & Reath LLP (57) ABSTRACT

Provided is a lightweight model training method, an image processing method, a device and a medium. The lightweight model training method includes: acquiring first and second augmentation probabilities and a target weight adopted in an e-th iteration; performing data augmentation on a data set based on the first and second augmentation probabilities respectively, to obtain first and second data sets; obtaining a first output value of a student model and a second output value of a teacher model based on the first data set; obtaining a third output value and a fourth output value based on the second data set; determining a distillation loss function, a truth-value loss function and a target loss function; training the student model based on the target loss function; and determining a first augmentation probability or target weight to be adopted in an (e+1)-th iteration in a case of e is less than E.

20 Claims, 7 Drawing Sheets

(56) References Cited

U.S. PATENT DOCUMENTS

| | | | |
|---|---|---|---|
| 2022/0101184 A1* | 3/2022 | Asif | G06N 3/045 |
| 2022/0101185 A1* | 3/2022 | Asif | G06V 10/751 |
| 2022/0261599 A1* | 8/2022 | Kastaniotis | G06N 3/04 |
| 2022/0301310 A1* | 9/2022 | Kim | G06V 10/82 |
| 2023/0005165 A1* | 1/2023 | Cai | G06T 7/50 |
| 2023/0214670 A1* | 7/2023 | Liu | G06N 3/08 |
| | | | 706/46 |

FOREIGN PATENT DOCUMENTS

| | | | | |
|---|---|---|---|---|
| CN | 112990342 A | * | 6/2021 | G06K 9/0063 |
| CN | 113592023 A | * | 11/2021 | G06F 18/217 |
| CN | 113807390 A | | 12/2021 | |
| CN | 114463798 A | | 5/2022 | |
| CN | 114863248 A | * | 8/2022 | G06N 3/045 |
| CN | 114897160 A | | 8/2022 | |
| WO | WO-2021044591 A1 | * | 3/2021 | G06F 18/2185 |
| WO | WO-2022132967 A1 | * | 6/2022 | A61B 6/468 |

OTHER PUBLICATIONS

Kui Ren et al., "Adversarial Attacks and Defenses in Deep Learning," Jan. 3, 2020,Engineering 6( 2020), pp. 348-356.*

Jianping Gou et al., "Knowledge Distillation: A Survey," Mar. 22, 2021, International Journal of Computer Vision,pp. 1-10.*

Tianze Gao et al., "Revisiting knowledge distillation for light-weight visual object detection," Aug. 13, 2021,Transactions of the Institute of Measurement and Control 2021, vol. 43(13),pp. 2888-2897.*

Abdollah Amirkhani et al., "Robust Semantic Segmentation With Multi-Teacher Knowledge Distillation," Sep. 2, 2021, IEEE Access, vol. 9,2021,pp. 119049-119060.*

Dongdong Wang et al., "Neural Networks are More Productive Teachers Than Human Raters: Active Mixup for Data-Efficient Knowledge Distillation from a Blackbox Model," Jun. 2020, Proceedings of the IEEE/CVF Conference on Computer Vision and Pattern Recognition (CVPR), 2020, pp. 1498-1505.*

Japanese Patent Office; Japanese Office Action; Japanese Application No. 2023-070644; 8 pages; dated May 21, 2024.

The State Intellectual Property Office of People's Republic of China; Chinese Application No. 202211059602.5; First Office Action; 8 pages; dated May 17, 2023.

The State Intellectual Property Office of People's Republic of China; Chinese Application No. 202211059602.5; Notification on Grant of the Patent Right for Invention; 6 pages; dated Jan. 4, 2024.

Ren, Kui et al.; Adversarial Attack and Defense in Deep Learning; English Abstract; Elsevier; 19 pages; Mar. 15, 2020.

* cited by examiner

LIGHTWEIGHT MODEL TRAINING METHOD, IMAGE PROCESSING METHOD, ELECTRONIC DEVICE, AND STORAGE MEDIUM

CROSS-REFERENCE TO RELATED APPLICATIONS

The present application claims priority to Chinese Patent Application No. CN202211059602.5, filed with the China National Intellectual Property Administration on Aug. 30, 2022, the disclosure of which is hereby incorporated herein by reference in its entirety.

TECHNICAL FIELD

The present disclosure relates to a field of computer technology, and specifically, to technical fields of machine learning, computer vision, image processing and the like.

BACKGROUND

Knowledge distillation is a commonly used model compression method, which refers to a training process by using a teacher model with higher precision to guide a student model, such that the student model may also obtain a precision indicator similar to that of the teacher model. The knowledge distillation itself has an effect of regularization. A method of knowledge distillation is used to train an overfitting model, which can prevent the model from overfitting to a certain extent. However, for some lightweight models, the use of knowledge distillation strategy for training may bring about a further underfitting phenomenon, leading to poor model precision, or even non-convergence.

SUMMARY

The present disclosure provides a lightweight model training method, an image processing method and apparatus, and an electronic device.

According to a first aspect of the present disclosure, provided is a lightweight model training method, including: acquiring a first augmentation probability, a second augmentation probability and a target weight adopted in an e-th iteration, the target weight being a weight of a distillation loss value, e being a positive integer not greater than E, and E being the maximum quantity of iterations and being a positive integer greater than 1; performing data augmentation on a data set based on the first augmentation probability and the second augmentation probability respectively, to obtain a first data set and a second data set; obtaining a first output value of a student model and a second output value of a teacher model based on the first data set, and obtaining a third output value of the student model and a fourth output value of the teacher model based on the second data set, the student model being a lightweight model; determining a distillation loss function based on the first output value and the second output value, and determining a truth-value loss function based on the third output value and the fourth output value; determining a target loss function based on the distillation loss function and the truth-value loss function; and training the student model based on the target loss function, and determining a first augmentation probability or target weight to be adopted in an (e+1)-th iteration in the case where e is less than E.

According to a second aspect of the present disclosure, provided is an image processing method, including: receiving an image to be processed in a target scene; and inputting the image to be processed into a student model, to acquire a processed result of the image to be processed output by the student model; where the student model is obtained by adopting the lightweight model training method provided according to the first aspect.

According to a third aspect of the present disclosure, provided is a lightweight model training apparatus, including: a first acquisition module, configured to acquire a first augmentation probability, a second augmentation probability and a target weight adopted in an e-th iteration, the target weight being a weight of a distillation loss value, e being a positive integer not greater than E, and E being the maximum quantity of iterations and being a positive integer greater than 1; a data augmentation module, configured to perform data augmentation on a data set based on the first augmentation probability and the second augmentation probability respectively, to obtain a first data set and a second data set; a prediction module, configured to obtain a first output value of a student model and a second output value of a teacher model based on the first data set, and obtain a third output value of the student model and a fourth output value of the teacher model based on the second data set, the student model being a lightweight model; a first determination module, configured to determine a distillation loss function based on the first output value and the second output value, and determine a truth-value loss function based on the third output value and the fourth output value; a second determination module, configured to determine a target loss function based on the distillation loss function and the truth-value loss function; a training module, configured to train the student model based on the target loss function; and a third determination module, configured to determine a first augmentation probability or target weight to be adopted in an (e+1)-th iteration in the case where e is less than E.

According to a fourth aspect of the present disclosure, provided is an image processing apparatus, including: a receiving module, configured to receive an image to be processed in a target scene; and a processing module, configured to input the image to be processed into a student model, to acquire a processed result of the image to be processed output by the student model; where the student model is obtained by adopting the lightweight model training method provided according to the first aspect.

According to a fifth aspect of the present disclosure, provided is an electronic device, including: at least one processor; and a memory connected in communication with the at least one processor; where the memory stores an instruction executable by the at least one processor, and the instruction, when executed by the at least one processor, enables the at least one processor to execute the methods provided in the first aspect and/or the second aspect as set forth above.

According to a sixth aspect of the present disclosure, provided is a non-transitory computer-readable storage medium storing a computer instruction thereon, where the computer instruction is used to cause a computer to execute the methods provided in the first aspect and/or the second aspect as set forth above.

According to a seventh aspect of the present disclosure, provided is a computer program product including a computer program, where the computer program, when executed by a processor, implements the methods provided in the first aspect and/or the second aspect as set forth above.

According to the technical solutions of the present disclosure, training precision of the lightweight model may be improved.

The foregoing summary is provided for a purpose of description only and is not intended to be limiting in any way. Except for exemplary aspects, implementations, and features as described above, further aspects, implementations, and features of the present application will be readily apparent with reference to the accompanying drawings and the following detailed description.

BRIEF DESCRIPTION OF THE DRAWINGS

In the accompanying drawings, same reference numerals refer to same or similar components or elements throughout a plurality of accompanying drawings unless otherwise specified. The accompanying drawings are not necessarily drawn to scale. It should be understood that the accompanying drawings only depict some implementations disclosed according to the present application, and should be not considered as limiting of the scope of the present application.

DETAILED DESCRIPTION

Hereinafter, descriptions to exemplary embodiments of the present disclosure are made with reference to the accompanying drawings, include various details of embodiments of the present disclosure to facilitate understanding, and should be considered as merely exemplary. Therefore, those having ordinary skill in the art should realize, various changes and modifications may be made to embodiments described herein, without departing from the scope of the present disclosure. Likewise, for clarity and conciseness, descriptions of well-known functions and structures are omitted in the following descriptions.

The terms "first", "second", "third", and the like in the description embodiments and claims of the present disclosure and the above-described drawings are intended to distinguish similar objects and not necessarily to describe a particular sequential or chronological order. Furthermore, the terms "comprise", "comprising", "include", and "including", as well as any variations thereof, are intended to cover a non-exclusive inclusion, for example, a series of steps or units is included. The methods, systems, products, or devices are not necessarily limited to the explicitly listed steps or units, but may include other steps or elements not expressly listed or inherent to such processes, methods, products, or devices.

In related technologies, knowledge distillation methods mainly include the followings: distillation based on model output, that is, directly supervising an output of a student model by using an output of a teacher model; distillation based on intermediate layer feature, that is, supervising an output of an intermediate feature map of the student model by using an intermediate feature map of the teacher model; and distillation based on relationship, that is, considering the differences between the teacher model and the student model in metrics such as similarity for different samples, thereby guiding the training of the student model.

Most of the above knowledge distillation methods are designed and selected for a loss function and a feature selection process of distillation, and a fitting state of the student model is rarely studied.

In a knowledge distillation process, the loss function includes a loss function for a distillation task (which may be termed as a knowledge distillation loss function) and a loss function for a truth-value (which may be termed as a truth-value loss function). The knowledge distillation loss function may increase a generalization performance of a model and have a regularization effect, and the truth-value loss function may make the model converge quickly.

In a depth training task, a large number of data augmentation processes are generally contained to enhance the generalization performance of the model. In a training process, operation, probability, and the like of the data augmentation are generally guaranteed to remain unchanged, which easily leads to inconsistency in the model training process. In the early stage of training, a goal of model training is to converge faster, and in the late stage of training, the goal of model training is to better generalize, while the guarantee of unchanged data augmentation may not satisfy the goals of the two training stages at the same time.

The current knowledge distillation algorithm does not consider the fitting state of the student model, and the teacher model is used to supervise the output of the student model, which may be easy to make the knowledge distillation process of a small model appear the underfitting state, thereby reducing precision of the model.

In order to at least partially solve the above problems and one or more of other potential problems, the present disclosure proposes a lightweight model training solution, which may effectively prevent the underfitting phenomenon in the case where a knowledge distillation strategy is adopted to train the lightweight model, thereby improving training precision of the lightweight model and enhancing precision of the knowledge distillation of the lightweight model.

Figure 1:
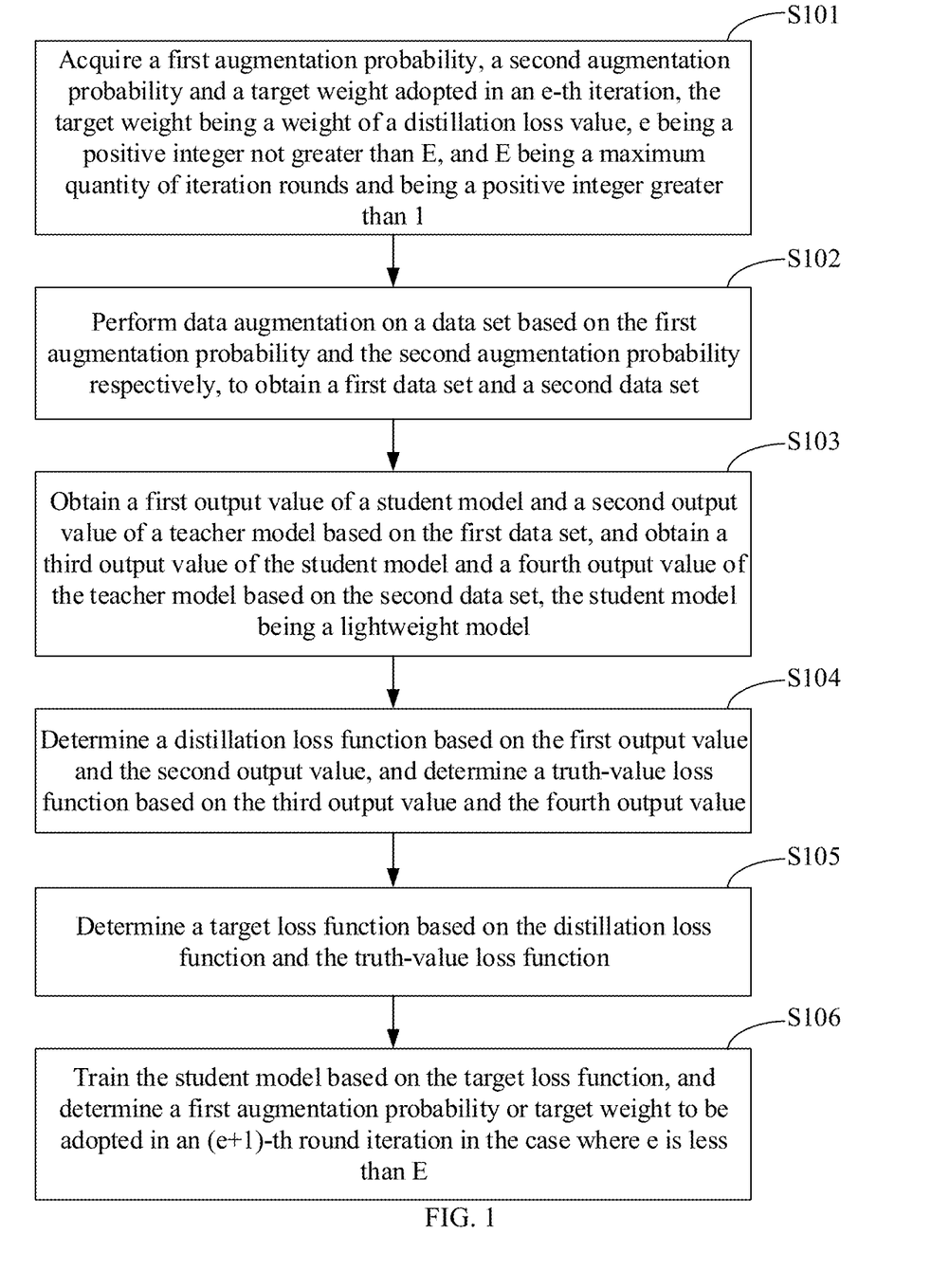
FIG. 1 is a schematic flowchart of a lightweight model training method according to embodiments of the present disclosure.

The embodiments of the present disclosure provide a lightweight model training method. FIG. 1 is a schematic flowchart of a lightweight model training method according to the embodiments of the present disclosure, and the lightweight model training method may be applied to a lightweight model training apparatus. The lightweight model training apparatus may be located in an electronic device, including, but is not limited to, a fixed device and/or a mobile device. For example, the fixed device includes, but is not limited to, a server, and the server may be a cloud server or a general server. For example, the mobile device includes, but is not limited to, one or more terminals of a mobile phone and a tablet computer. In some possible implementations, the lightweight model training method may also be implemented by a processor invoking a computer-readable instruction stored in a memory. As shown in FIG. 1, the lightweight model training method includes the followings.

In S101, a first augmentation probability, a second augmentation probability and a target weight adopted in an e-th iteration are acquired, the target weight being a weight of a distillation loss value, e being a positive integer not greater than E, and E being a maximum quantity of iterations and being a positive integer greater than 1.

In S102, data augmentation is performed on a data set based on the first augmentation probability and the second augmentation probability respectively, to obtain a first data set and a second data set.

In S103, a first output value of a student model and a second output value of a teacher model are obtained based on the first data set, and a third output value of the student model and a fourth output value of the teacher model are obtained based on the second data set, the student model being a lightweight model.

In S104, a distillation loss function is determined based on the first output value and the second output value, and a truth-value loss function is determined based on the third output value and the fourth output value.

In S105, a target loss function is determined based on the distillation loss function and the truth-value loss function.

In S106, the student model is trained based on the target loss function, and a first augmentation probability or target weight to be adopted in an (e+1)-th iteration is determined in the case where e is less than E.

In the embodiments of the present disclosure, the student model is used for image processing. The present disclosure does not limit the function of the student model according to its own scene and usage. For example, the student model is used for image classification. For another example, the student model is used for image recognition. For still another example, the student model is used for target detection. The above is merely an exemplary illustration and is not intended as a limitation on all possible functions of the student model, and thus it is not exhaustive here.

In the embodiments of the present disclosure, the teacher model is a model that has been trained. It should be noted that the present disclosure does not limit a magnitude of the teacher model, and the teacher model may be either a large model or a small model.

In the embodiments of the present disclosure, a value of E may be set according to a requirement, such as a speed requirement or a precision requirement.

In the embodiments of the present disclosure, a value of the second augmentation probability is different from that of the first augmentation probability. In general, the value of the second augmentation probability is greater than that of the first augmentation probability.

In the embodiments of the present disclosure, a total loss function includes distillation item loss and truth-value term loss, where if a weight of the distillation item loss is $\alpha$, a weight of the truth-value term loss is $1-\alpha$.

In the embodiments of the present disclosure, before the starting of the e-th iteration, the data set input for the e-th iteration may be a combination of the first data set and the second data set generated based on the (e−1)-th iteration, a partial set of the first data set and the second data set generated based on the (e−1)-th iteration, or an original data set. The above is merely an exemplary illustration and is not intended as a limitation on all possible types of data included in the data set input for the e-th iteration, and thus it is not exhaustive here.

In the embodiments of the present disclosure, the data augmentation is used to increase a data volume of the data set (also termed as a training set). Through data augmentation, the diversity of the data set may be increased, the overfitting may be reduced, and the generalization ability of the model may be improved.

In the embodiments of the present disclosure, how to determine the distillation loss function, the truth-value loss function and the target loss function will be described in detail in subsequent embodiments, and will not be repeated here.

In the embodiments of the present disclosure, a network structure of the student model may include convolutional neural networks (CNN) and transformer. The above is merely an exemplary illustration and is not intended as a limitation on all possible network types included in the student model, and thus it is not exhaustive here.

According to the technical solution of the embodiments of the present disclosure, the first augmentation probability, the second augmentation probability and the target weight adopted in the e-th iteration are acquired; data augmentation is performed on the data set based on the first augmentation probability and the second augmentation probability respectively, to obtain the first data set and the second data set; the first output value of the student model and the second output value of the teacher model are obtained based on the first data set, and the third output value of the student model and the fourth output value of the teacher model are obtained based on the second data set, the student model being the lightweight model; the distillation loss function is determined based on the first output value and the second output value, and the truth-value loss function is determined based on the third output value and the fourth output value; the target loss function is determined based on the distillation loss function and the truth-value loss function; and the student model is trained based on the target loss function, and the first augmentation probability or target weight to be adopted in the (e+1)-th iteration is determined in the case where e is less than E. In this way, through data augmentation, the diversity of the data set may be increased, the overfitting may be reduced, and the generalization ability of the lightweight model may be improved. At the same time, in the case where e is less than E, by means of determining the first augmentation probability or target weight to be adopted in the (e+1)-th iteration, it is capable of dynamically adjusting the first augmentation probability or the target weight in the whole training process, and effectively preventing the underfitting phenomenon in the case where a knowledge distillation strategy is adopted to train the lightweight model, thereby improving the training precision of the model.

In some embodiments, the lightweight model training method may further include: step a, acquiring a maximum augmentation probability; and determining the second augmentation probability based on the maximum augmentation probability, the maximum quantity of iterations and the first augmentation probability.

In the embodiments of the present disclosure, if the first augmentation probability is $p_i$, the maximum augmentation probability is $p_{aug}$, and the maximum quantity of iterations is E, the second augmentation probability is $p_i + p_{aug} \times 2/E$.

Here, the maximum augmentation probability may be set or adjusted according to a requirement, such as a speed requirement, a precision requirement, or a generalization ability requirement.

In the embodiments of the present disclosure, step a is executed before S101.

The present disclosure does not limit an acquisition mode of the maximum augmentation probability. For example, a training-related parameter is received through a user interface. For another example, a training-related parameter sent by a terminal is received. The training-related parameter includes the maximum augmentation probability. The above is merely an exemplary illustration and is not intended as a limitation on all possible sources of the maximum augmentation probability, and thus it is not exhaustive here.

It should be noted that a set value of the maximum augmentation probability may be different for different student models.

In this way, the determined second augmentation probability is not only related to the first augmentation probability and the maximum quantity of iterations, but also to the maximum augmentation probability, and thus it is capable of improving generalization and accuracy of the second data set, making the third output value output by the student model and the fourth output value output by the teacher model more accurate, and facilitating to improve accuracy of selection of the target loss function, thereby facilitating to improve the training precision of the lightweight model.

In some embodiments, the determining of the first augmentation probability to be adopted in the (e+1)-th iteration includes: determining the first augmentation probability to be adopted in the (e+1)-th iteration based on the maximum augmentation probability, the maximum quantity of iterations, and the first augmentation probability of the e-th iteration.

In the embodiments of the present disclosure, the first augmentation probability to be adopted in the (e+1)-th iteration is expressed as $p_i = p_i + p_{aug} \times 2/E$, where the first augmentation probability is $p_i$, the maximum augmentation probability is $p_{aug}$, and the maximum quantity of iterations is E.

In this way, the determined first augmentation probability is not only related to the first augmentation probability of the previous iteration and the maximum quantity of iterations, but also to the maximum augmentation probability, and thus it is capable of improving the generalization and accuracy of the first data set, making the first output value output by the student model and the second output value output by the teacher model more accurate, and facilitating to improve the accuracy of selection of the target loss function, thereby facilitating to improve the training precision of the lightweight model.

In some embodiments, the lightweight model training method may further include: step b, acquiring a maximum target weight.

In the embodiments of the present disclosure, step b is executed before S101. Step b may be executed before step a, step b may be executed after step a, or step b and step a may be executed simultaneously.

The present disclosure does not limit an acquisition mode of the maximum target weight. For example, a training-related parameter is received through a user interface. For another example, a training-related parameter sent by a terminal is received. The training-related parameter includes the maximum target weight. The above is merely an exemplary illustration and is not intended as a limitation on all possible acquisition modes of the maximum target weight, and thus it is not exhaustive here.

It should be noted that a set value of the maximum target weight may be different for different student models.

In some embodiments, the determining of the target weight to be adopted in the (e+1)-th iteration includes: determining the target weight to be adopted in the (e+1)-th iteration based on the maximum target weight, the maximum quantity of iterations, and the target weight of the e-th iteration.

In the embodiments of the present disclosure, the target weight to be adopted in the (e+1)-th iteration is expressed as $a = a + a_{dft} \times 2/E$, where the target weight of the e-th iteration is a, the maximum target weight is $a_{dft}$, and the maximum quantity of iterations is E.

In this way, the determined target weight is not only related to the target weight of the previous iteration and the maximum quantity of iterations, but also to the maximum target weight, and thus it is capable of improving the accuracy of the target loss function selection, thereby facilitating to improve the training precision of the lightweight model.

In the embodiments of the present disclosure, the determining of the target loss function based on the distillation loss function and the truth-value loss function includes: determining the distillation loss function as the target loss function in the case where the target weight is not less than the maximum target weight or the distillation loss function is not less than the truth-value loss function; and determining the truth-value loss function as the target loss function in other cases.

In the embodiments of the present disclosure, if $a \geq a_{dft}$ or $l1 \geq l2$, the loss function l2 is used for back propagation and gradient update of the model, and the first augmentation probability to be adopted in the (e+1)-th iteration is set as $p_i = p_i + p_{aug} \times 2/E$. In other cases, the loss function l1 is used for back propagation and gradient update of the model, and the target weight to be adopted in the (e+1)-th iteration is set as $a = a + a_{dft} \times 2/E$.

In this way, in the training process, the appropriate target loss function may be selected according to the training situation, thereby facilitating to improve the training precision of the lightweight model.

In the embodiments of the present disclosure, the determining of the distillation loss function based on the first output value and the second output value includes: determining the distillation loss function according to a formula as follow: $l1 = (a + a_{dft} \times 2/E) \times L_{dist}(o1s, o1t) + (1 - a - a_{dft} \times 2/E) \times L_{gt}(o1s, gt)$; where l1 represents the distillation loss function, $L_{dist}(o1s, o1t)$ represents a distillation loss value determined according to the first output value and the second output value, $L_{gt}(o1s, gt)$ represents a truth-value loss value determined according to the first output value and a truth-value, a represents the target weight, $a_{dft}$ represents a maximum target weight, E represents the maximum quantity of iterations, gt represents the truth-value, o1s represents the first output value, and o1t represents the second output value.

In this way, the distillation loss function can be quickly determined, the distillation loss function is related to the target weight and the maximum quantity of iterations, and thus it is capable of facilitating to improve the accuracy of the distillation loss function, thereby facilitating to improve the training precision of the lightweight model.

In the embodiments of the present disclosure, the determining of the truth-value loss function based on the third output value and the fourth output value includes: determining the truth-value loss function according to a formula as follow: $l2=a\times L_{dist}(o2s,o2t)+(1-a)\times L_{gt}(o2s,gt)$; where l2 represents the truth-value loss function, $L_{dist}(o2s,o2t)$ represents a distillation loss value determined according to the third output value and the fourth output value, $L_{gt}(o2s,gt)$ represents a truth-value loss value determined according to the third output value and a truth-value, a represents the target weight, gt represents the truth-value, o2s represents the third output value, and o2t represents the fourth output value.

In this way, the truth-value loss function can be quickly determined, the truth-value loss function is related to the target weight and the maximum quantity of iterations, and it is capable of facilitating to improve the accuracy of the truth-value loss function, thereby facilitating to improve the training precision of the lightweight model.

Figure 2:
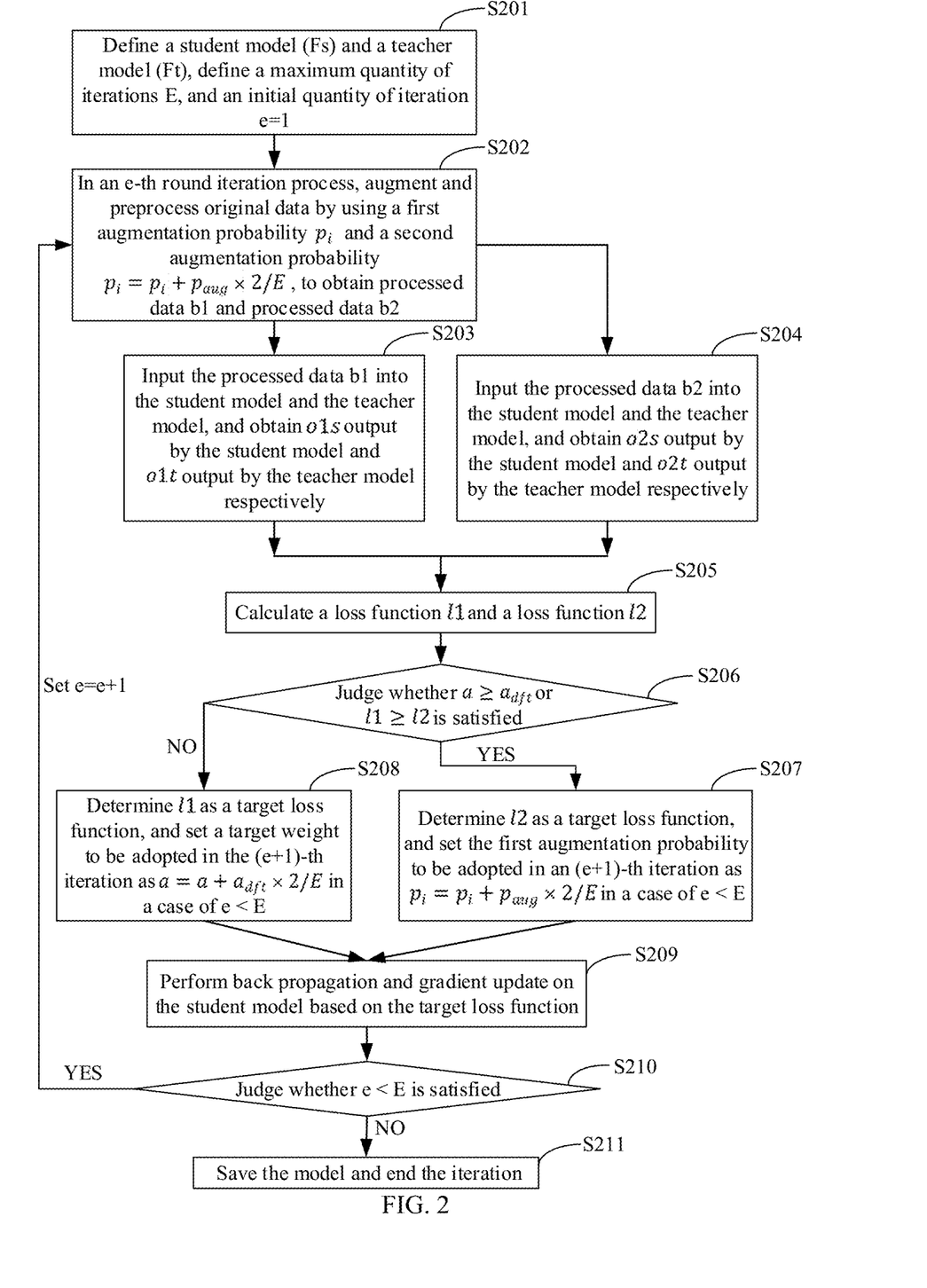
FIG. 2 is a schematic diagram of a training flow of a lightweight model based on knowledge distillation according to embodiments of the present disclosure.

FIG. 2 shows a schematic diagram of a training flow of a lightweight model based on knowledge distillation. As shown in FIG. 2, the flow includes: S201: defining a student model (Fs) and a teacher model (Ft), defining a maximum quantity of iterations E, and an initial quantity of iteration e being equal to 1, where the teacher model is a model that has been trained; S202: in an e-th iteration process, augmenting and preprocessing original data using a first augmentation probability $p_i$ and a second augmentation probability $p_i=p_i+p_{aug}\times 2/E$, to obtain processed data b1 and processed data b2; S203: inputting the processed data b1 into the student model and the teacher model, and obtaining o1s output by the student model and o1t output by the teacher model respectively; S204: inputting the processed data b2 into the student model and the teacher model, and obtaining o2s output by the student model and o2t output by the teacher model, respectively; S205: calculating a loss function l1 and a loss function l2; S206: judging whether $a\geq a_{dft}$ or $l1\geq l2$ is satisfied, executing S207 in the case where a judgment result is true, and executing S208 in the case where the judgment result is false; S207: determining l2 as a target loss function, and setting the first augmentation probability to be adopted in an (e+1)-th iteration as $p_i=p_i+p_{aug}\times 2/E$ in a case of e<E; S208: determining l1 as a target loss function, and setting a target weight to be adopted in the (e+1)-th iteration as $a=a+a_{dft}\times 2/E$ in a case of e<E; S209: performing back propagation and gradient update on the student model based on the target loss function; S210: judging whether e<E is satisfied, setting e=e+1 and returning to step S202 in the case where a judgment result is true, and executing S211 in the case where the judgment result is false; and S211: saving the model and ending the iteration.

In this way, in the training process of the lightweight model based on knowledge distillation, an influence of the data augmentation probability and the distillation loss function weight on the training process is considered, dynamic adjustment of model parameters related to regularization is proposed in the training process, such as the weight of distillation loss function, the probability of data augmentation, and the like, and thus the precision of knowledge distillation of the lightweight model is ultimately improved.

The above processing flow may be merged with all knowledge distillation algorithms, and may be applied to different visual tasks. The visual tasks include image processing, and the image processing includes, but is not limited to, image recognition, image classification, target detection, image segmentation and other processing.

It should be understood that the flowchart shown in FIG. 2 is only exemplary and not restrictive. Various obvious changes and/or replacements may be made by those skilled in the art based on the example of FIG. 2, and the resulted technical solutions still fall within the scope of the embodiments of the present disclosure.

Figure 3:
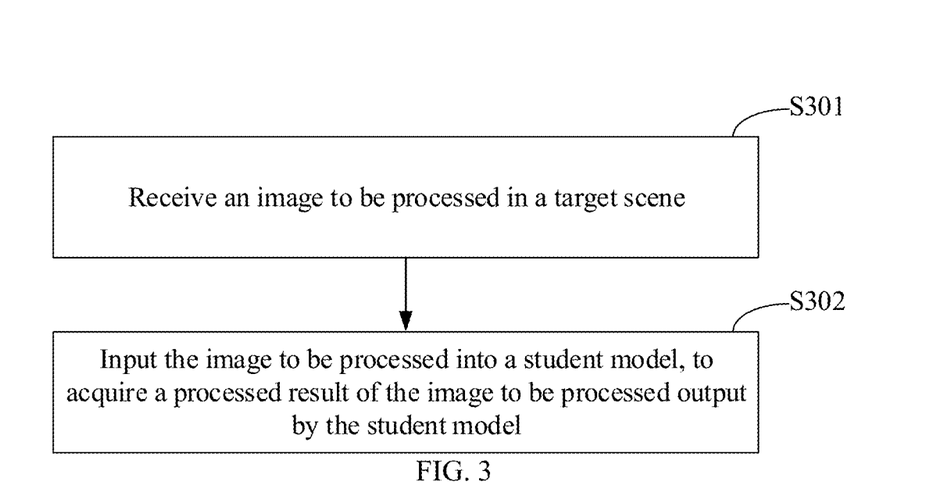
FIG. 3 is a schematic flowchart of an image processing method according to embodiments of the present disclosure.

Based on the student model trained by the above lightweight model training method, the embodiments of the present disclosure disclose an image processing method, and the image processing method is applied to an electronic device. The electronic device includes, but is not limited to, a computer, a mobile phone, a tablet computer, or the like. The present disclosure does not limit the type of the electronic device. As shown in FIG. 3, the image processing method includes: S301, receiving an image to be processed in a target scene; and S302, inputting the image to be processed into a student model, to acquire a processed result of the image to be processed output by the student model.

In an example, the student model is obtained by adopting the lightweight model training method shown in FIG. 1.

In this way, the accuracy of image processing may be improved by adopting the trained student model for image processing.

In some embodiments, the receiving of the image to be processed in the target scene includes at least one of: acquiring an image to be processed in an image classification scene; acquiring an image to be processed in an image recognition scene; or acquiring an image to be processed in a target detection scene.

It may be understood that the target scene includes, but is not limited to, the scenes listed above, and any scene related to image processing may be used as the target scene, which is not exhaustive here.

In this way, the trained student model may be used to process images in different target scenes, thereby improving an image processing ability of the student model.

Figure 4:
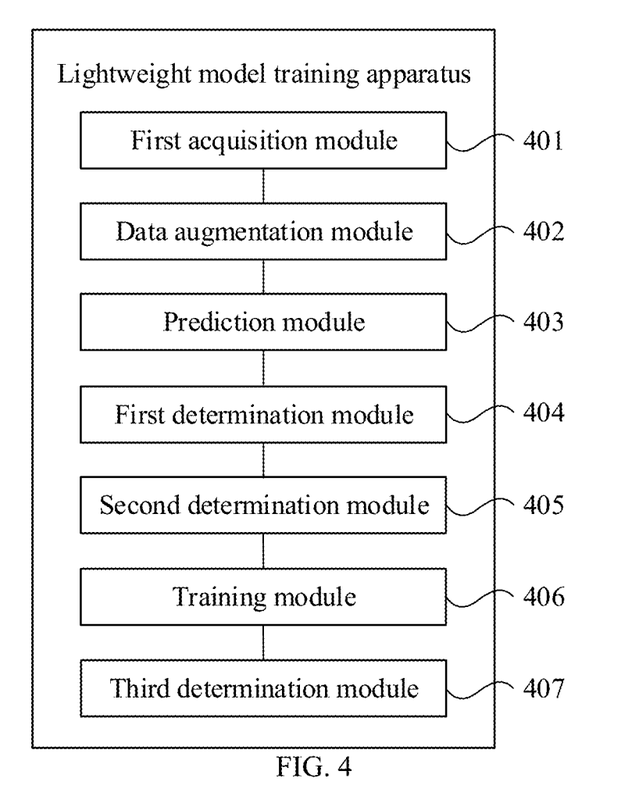
FIG. 4 is a schematic structural diagram of a lightweight model training apparatus according to embodiments of the present disclosure.

The embodiments of the present disclosure provide a lightweight model training apparatus. As shown in FIG. 4, the apparatus may include: a first acquisition module 401, configured to acquire a first augmentation probability, a second augmentation probability and a target weight adopted in an e-th iteration, the target weight being a weight of a distillation loss value, e being a positive integer not greater than E, and E being a maximum quantity of iterations and being a positive integer greater than 1; a data augmentation module 402, configured to perform data augmentation on a data set based on the first augmentation probability and the second augmentation probability respectively, to obtain a first data set and a second data set; a prediction module 403, configured to obtain a first output value of a student model and a second output value of a teacher model based on the first data set, and obtain a third output value of the student model and a fourth output value of the teacher model based on the second data set, the student model being a lightweight model; a first determination module 404, configured to determine a distillation loss function based on the first output value and the second output value, and determine a truth-value loss function based on the third output value and the fourth output value; a second determination module 405, configured to determine a target loss function based on the distillation loss function and the truth-value loss function; a training module 406, configured to train the student model based on the target loss function; and a third determination module 407, configured to determine a first augmentation probability or target weight to be adopted in an (e+1)-th iteration in the case where e is less than E.

In some embodiments, the lightweight training apparatus may further include: a second acquisition module, configured to acquire a maximum augmentation probability; and a fourth determination module, configured to determine the second augmentation probability based on the maximum augmentation probability, the maximum quantity of iterations and the first augmentation probability.

In some embodiments, the third determination module 407 includes: a first determination sub-unit, configured to determine the first augmentation probability to be adopted in the (e+1)-th iteration based on the maximum augmentation probability, the maximum quantity of iterations and the first augmentation probability of the e-th iteration.

In some embodiments, the lightweight training apparatus may further include: a third acquisition module, configured to acquire a maximum target weight. The third determination module 407 includes: a second determination sub-unit, configured to determine the target weight to be adopted in the (e+1)-th iteration based on the maximum target weight, the maximum quantity of iterations, and the target weight of the e-th iteration.

In some embodiments, the second determination module 405 includes: a third determination sub-unit, configured to determine the distillation loss function as the target loss function in the case where the target weight is not less than the maximum target weight or the distillation loss function is not less than the truth-value loss function, and determine the truth-value loss function as the target loss function in other cases.

In some embodiments, the first determination module 404 includes: a fourth determination sub-unit, configured to determine the distillation loss function according to a formula as follows: $l1=(a+a_{dft}\times 2/E)\times L_{dist}(o1s,o1t)+(1-a-a_{dft}\times 2/E)\times L_{gt}(o1s,gt)$; where l1 represents the distillation loss function, $L_{dist}(o1s,o1t)$ represents a distillation loss value determined according to the first output value and the second output value, $L_{gt}(o1s,gt)$ represents a truth-value loss value determined according to the first output value and a truth-value, a represents the target weight, a dft represents the maximum target weight, E represents the maximum quantity of iterations, gt represents the truth-value, o1s represents the first output value, and o1t represents the second output value.

In some embodiments, the first determination module 404 further includes: a fifth determination sub-unit, configured to determine the truth-value loss function according to the following formula: $l2=a\times L_{dist}(o2s,o2t)+(1-a)\times L_{gt}(o2s,gt)$; where l2 represents the truth-value loss function, $L_{dist}(o2s,o2t)$ represents a distillation loss value determined according to the third output value and the fourth output value, $L_{gt}(o2s,gt)$ represents a truth-value loss value determined according to the third output value and a truth-value, a represents the target weight, gt represents the truth-value, o2s represents the third output value, and o2t represents the fourth output value.

It should be understood by those skilled in the art that the functions of the processing modules in the lightweight model training apparatus according to the embodiments of the present disclosure may be appreciated with reference to the foregoing related description of the lightweight model training method. The processing modules in the lightweight model training apparatus according to the embodiments of the present disclosure may be implemented by analog circuits for implementing the functions described in the embodiments of the present disclosure, or by running software for implementing the functions described in the embodiments of the present disclosure on an electronic device.

The lightweight model training apparatus according to the embodiments of the present disclosure can improve the training precision of the lightweight model.

Figure 5:
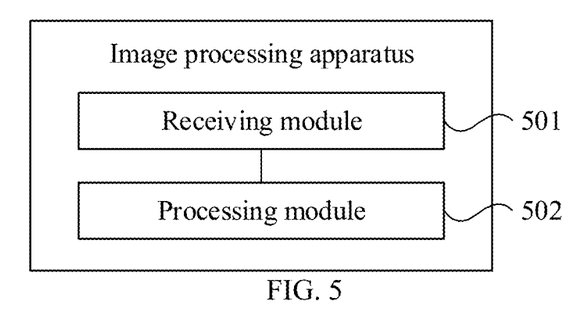
FIG. 5 is a schematic structural diagram of an image processing apparatus according to embodiments of the present disclosure.

The embodiments of the present disclosure provide an image processing apparatus, which is applied to an electronic device. As shown in FIG. 5, the apparatus may include: a receiving module 501, configured to receive an image to be processed in a target scene; and a processing module 502, configured to input the image to be processed into a student model, to acquire a processed result of the image to be processed output by the student model, where the student model is obtained by adopting the lightweight model training method.

In some embodiments, acquiring, by the receiving module 501, the image to be processed in the target scene, includes at least one of: acquiring an image to be processed in an image classification scene; acquiring an image to be processed in an image recognition scene; or acquiring an image to be processed in a target detection scene.

It should be understood by those skilled in the art that the functions of the processing modules in the image processing apparatus according to the embodiments of the present disclosure may be appreciated with reference to the foregoing related description of the image processing method. The processing modules in the image processing apparatus according to the embodiments of the present disclosure may be implemented by analog circuits for implementing the functions described in the embodiments of the present disclosure, or by running software for implementing the functions described in the embodiments of the present disclosure on the electronic device.

The image processing apparatus according to the embodiments of the present disclosure can improve the precision of the image processing.

Figure 6:
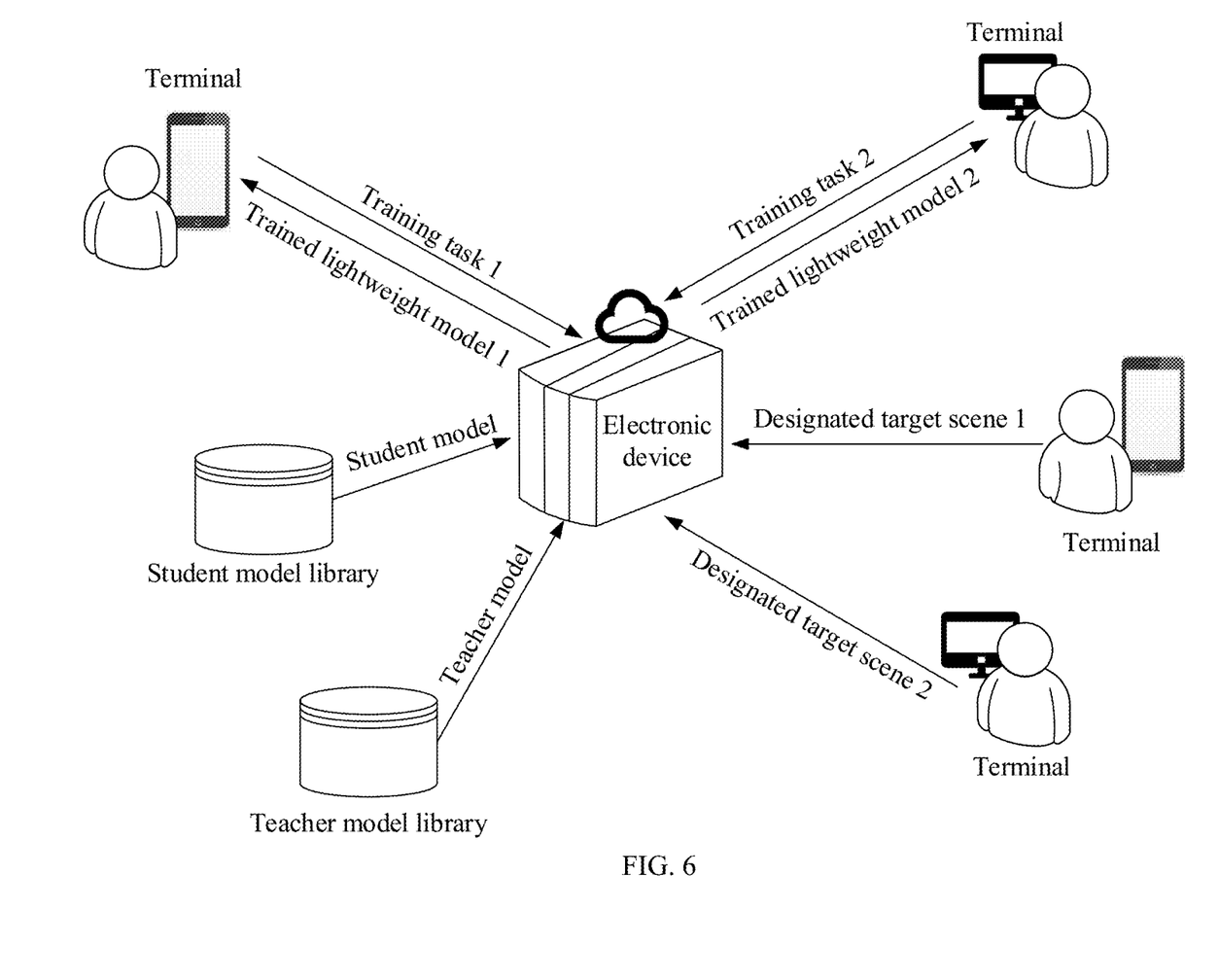
FIG. 6 is a schematic diagram of a lightweight model training scene according to embodiments of the present disclosure.

The embodiments of the present disclosure also provide a schematic diagram of a scene of lightweight model training. As shown in FIG. 6, an electronic device, such as a cloud server, determines a teacher model and a student model to be trained for each training task according to the training tasks sent by terminals. Here, the training tasks sent by different terminals may be training tasks for different usage scenes. The electronic device trains the student model, including the following steps: acquiring a first augmentation probability, a second augmentation probability and a target weight adopted in an e-th iteration, the target weight being a weight of distillation loss value, e being an integer greater than 0 and less than or equal to E, and E being a maximum quantity of iterations; performing data augmentation on a data set based on the first augmentation probability and the second augmentation probability respectively, to obtain a first data set and a second data set; obtaining a first output value of the student model and a second output value of the teacher model based on the first data set, and obtaining a third output value of the student model and a fourth output value of the teacher model based on the second data set, the student model being a lightweight model; determining a distillation loss function based on the first output value and the second output value, and determining a truth-value loss function based on the third output value and the fourth output value; determining a target loss function based on the distillation loss function and the truth-value loss function; and training the student model based on the target loss function, and determining a first augmentation probability or target weight to be adopted in an (e+1)-th iteration in the case where e is less than E. The electronic device returns the trained student model to each terminal.

Figure 7:
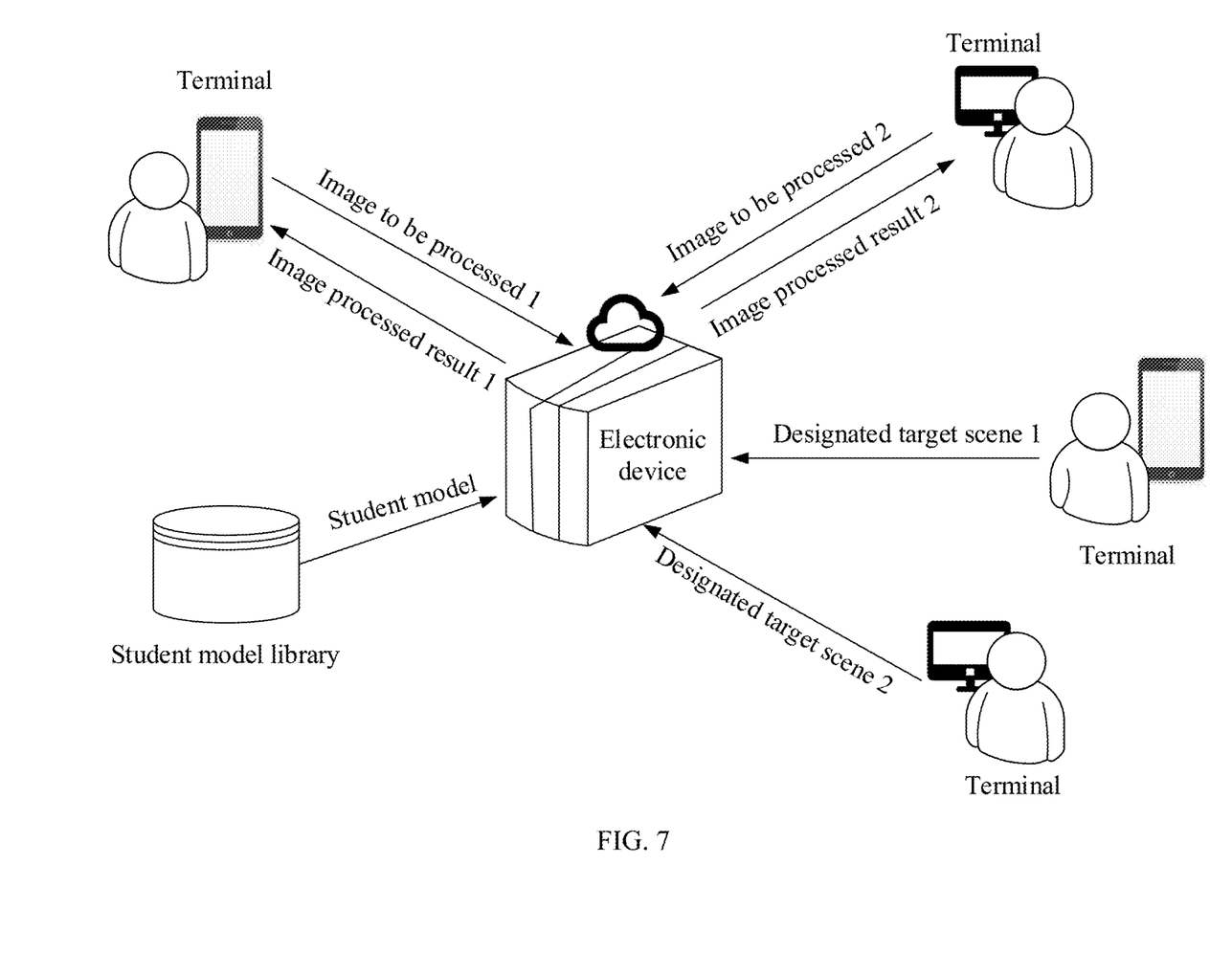
FIG. 7 is a schematic diagram of an image processing scene according to embodiments of the present disclosure.

The embodiments of the present disclosure also provide a schematic diagram of an image processing scene. As shown in FIG. 7, an electronic device, such as a cloud server, receives an image to be processed and a designated target scene sent by each terminal, and inputs each image to be processed to a student model corresponding to the target scene, to obtain an image processed result output by the corresponding student model.

The quantity of the terminals and the electronic devices is not limited in the present disclosure. In practical applications, a plurality of terminals and a plurality of electronic devices may be included.

It should be understood that the scene diagrams shown in FIGS. 6 and 7 are only exemplary and not restrictive. Various obvious changes and/or replacements may be made by those skilled in the art based on the examples of FIGS. 6 and 7, and the resulted technical solutions still fall within the scope of the embodiments of the present disclosure.

In the technical solutions of the present disclosure, the acquisition, storage and application of user's personal information involved are all in compliance with the provisions of relevant laws and regulations, and do not violate public order and good customs.

According to the embodiments of the present disclosure, the present disclosure also provides an electronic device, a readable storage medium and a computer program product.

Figure 8:
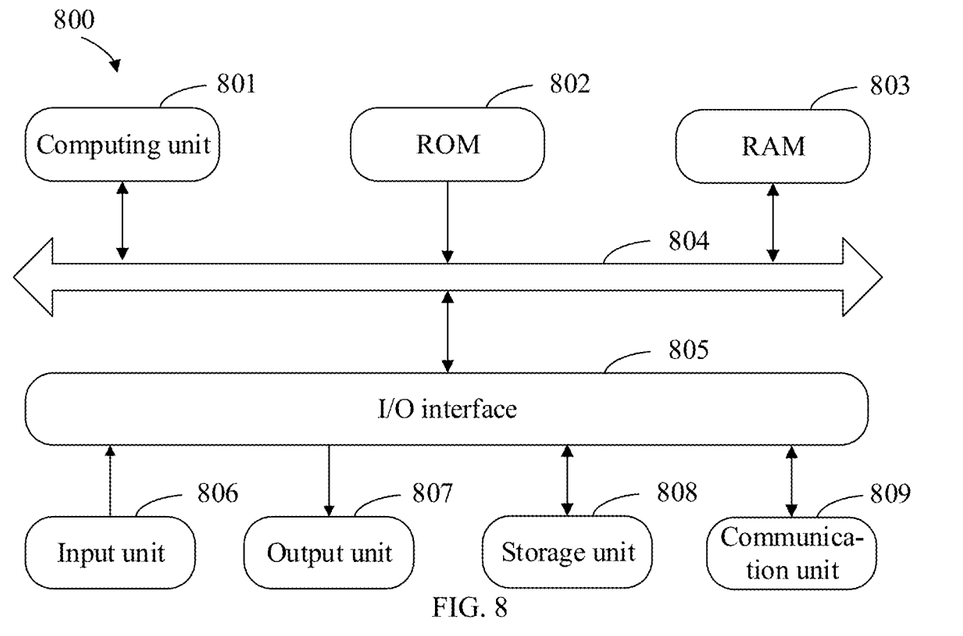
FIG. 8 is a block diagram of an electronic device for implementing a lightweight model training method or an image processing method according to embodiments of the present disclosure.

FIG. 8 shows a schematic block diagram of an exemplary electronic device 800 that may be used to implement the embodiments of the present disclosure. The electronic device 800 is intended to represent various forms of digital computers, such as a laptop, a desktop, a workstation, personal digital assistant, a server, a blade server, a mainframe computer, and other suitable computers. The electronic device 800 may also represent various forms of mobile devices, such as personal digital processing, a cellular phone, a smart phone, a wearable device and other similar computing devices. The components shown herein, their connections and relationships as well as their functions are merely examples, and are not intended to limit implementations of the present disclosure described and/or required herein.

As shown in FIG. 8, the electronic device 800 includes a computing unit 801 that may perform various appropriate actions and processes according to a computer program stored in a Read-Only Memory (ROM) 802 or a computer program loaded from a storage unit 808 into a Random Access Memory (RAM) 803. In the RAM 803, various programs and data required for an operation of device 800 may also be stored. The computing unit 801, ROM 802 and RAM 803 are connected each other through bus 804. The input/output (I/O) interface 805 is also connected to the bus 804.

A plurality of components in the electronic device 800 are connected to the VO interface 805, and include an input unit 806 such as a keyboard, a mouse, or the like an output unit 807 such as various types of displays, speakers, or the like, the storage unit 808 such as a magnetic disk, an optical disk, or the like, and a communication unit 809 such as a network card, a modem, a wireless communication transceiver, or the like. The communication unit 809 allows the electronic device 800 to exchange information/data with other devices through a computer network such as Internet and/or various telecommunication networks.

The computing unit 801 may be various general-purpose and/or special-purpose processing components with processing and computing capabilities. Some examples of the computing unit 801 include, but are not limited to, a Central Processing Unit (CPU), a Graphics Processing Unit (GPU), various dedicated Artificial Intelligence (AI) computing chips, various computing units running machine learning model algorithms, a Digital Signal Processor (DSP), and any appropriate processors, controllers, microcontrollers, or the like. The computing unit 801 performs various methods and processing described above, such as the above lightweight model training method and/or image processing method. For example, in some implementations, the above lightweight model training method and/or image processing method may be implemented as a computer software program that is tangibly contained in a computer-readable medium, such as the storage unit 808. In some implementations, a part or all of the computer program may be loaded and/or installed on the electronic device 800 via ROM 802 and/or the communication unit 809. When the computer program is loaded into RAM 803 and executed by the computing unit 801, one or more steps of the lightweight model training method and/or image processing method described above may be performed. Alternatively, in other implementations, the computing unit 801 may be configured to perform the above lightweight model training method and/or image processing method by any other suitable means (e.g., by means of firmware).

Various implements of the system and technologies described above herein may be implemented in a digital electronic circuit system, an integrated circuit system, a Field Programmable Gate Array (FPGA), an Application Specific Integrated Circuit (ASIC), Application Specific Standard Parts (ASSP), a System on Chip (SOC), a Complex Programmable Logic Device (CPLD), a computer hardware, firmware, software, and/or a combination thereof. These various implementations may be implemented in one or more computer programs, and the one or more computer programs may be executed and/or interpreted on a programmable system including at least one programmable processor. The programmable processor may be a special-purpose or general-purpose programmable processor, may receive data and instructions from a storage system, at least one input device, and at least one output device, and may transmit the data and the instructions to the storage system, the at least one input device, and the at least one output device.

The program code for implementing the method of the present disclosure may be written in any combination of one or more programming languages. These program codes may be provided to a processor or controller of a general-purpose computer, a special-purpose computer or other programmable data processing devices, such that the program code, when executed by the processor or controller, enables the functions/operations specified in the flowchart and/or block diagram to be implemented. The program code may be completely executed on a machine, partially executed on the machine, partially executed on the machine as a separate software package and partially executed on a remote machine, or completely executed on the remote machine or a server.

In the context of the present disclosure, a machine-readable medium may be a tangible medium, which may contain or store a procedure for use by or in connection with an instruction execution system, device or apparatus. The machine-readable medium may be a machine-readable signal medium or a machine-readable storage medium. The machine-readable medium may include, but is not limited to, an electronic, magnetic, optical, electromagnetic, infrared or semiconductor system, device or apparatus, or any suitable combination thereof. More specific examples of the machine-readable storage medium may include electrical connections based on one or more lines, a portable computer disk, a hard disk, a Random Access Memory (RAM), a Read-Only Memory (ROM), an Erasable Programmable Read-Only Memory (EPROM or a flash memory), an optical fiber, a portable Compact Disc Read-Only Memory (CD-ROM), an optical storage device, a magnetic storage device, or any suitable combination thereof.

In order to provide interaction with a user, the system and technologies described herein may be implemented on a computer. The computer has a display apparatus (e.g., a cathode ray tube (CRT) or a Liquid Crystal Display (LCD) monitor) for displaying information to the user; and a keyboard and a pointing device (e.g., a mouse or a trackball) through which the user may provide input to the computer. Other types of devices may also be used to provide interaction with the user. For example, feedback provided to the user may be any form of sensory feedback (e.g., visual feedback, auditory feedback, or tactile feedback), and the input from the user may be received in any form (including an acoustic input, a voice input, or a tactile input).

The system and technologies described herein may be implemented in a computing system (which serves as, for example, a data server) including a back-end component, a computing system (which serves as, for example, an application server) including a middleware, a computing system including a front-end component (e.g., a user computer with a graphical user interface or web browser through which the user may interact with implementations of the system and technologies described herein), or a computing system including any combination of the back-end component, the middleware component, or the front-end component. The components of the system may be connected each other through any form or kind of digital data communication (e.g., a communication network). Examples of the communication network include a Local Area Network (LAN), a Wide Area Network (WAN), and Internet.

A computer system may include a client and a server. The client and the server are generally far away from each other and usually interact with each other through a communication network. A relationship between the client and the server is generated by computer programs running on corresponding computers and having a client-server relationship with each other. The server may be a cloud server, a distributed system server, or a blockchain server. It should be understood that the steps may be reordered, added or removed by using the various forms of the flows described above. For example, the steps recorded in the present disclosure may be performed in parallel, in sequence, or in different orders, as long as a desired result of the technical scheme disclosed in the present disclosure can be realized, which is not limited herein.

The foregoing specific implementations do not constitute a limitation on the protection scope of the present disclosure. Those having ordinary skill in the art should understand that, various modifications, combinations, sub-combinations and substitutions may be made according to a design requirement and other factors. Any modification, equivalent replacement, improvement or the like made within the spirit and principle of the present disclosure should be included in the protection scope of the present disclosure.

What is claimed is:

1. A lightweight model training method, comprising:
   acquiring a first augmentation probability, a second augmentation probability and a target weight adopted in an e-th iteration, the target weight being a weight of a distillation loss value, e being a positive integer not greater than E, and E being a maximum quantity of iterations and being a positive integer greater than 1;
   performing data augmentation on a data set based on the first augmentation probability and the second augmentation probability respectively, to obtain a first data set and a second data set;
   obtaining a first output value of a student model and a second output value of a teacher model based on the first data set;
   obtaining a third output value of the student model and a fourth output value of the teacher model based on the second data set, and the student model being a lightweight model;
   determining a distillation loss function based on the first output value and the second output value;
   determining a truth-value loss function based on the third output value and the fourth output value;
   determining a target loss function based on the distillation loss function and the truth-value loss function;
   training the student model based on the target loss function; and
   determining a first augmentation probability or target weight to be adopted in an (e+1)-th iteration in a case of e is less than E.

2. The method of claim 1, further comprising:
   acquiring a maximum augmentation probability; and
   determining the second augmentation probability based on the maximum augmentation probability, the maximum quantity of iterations and the first augmentation probability.

3. The method of claim 2, wherein determining the first augmentation probability to be adopted in the (e+1)-th iteration, comprises:
   determining the first augmentation probability to be adopted in the (e+1)-th iteration based on the maximum augmentation probability, the maximum quantity of iterations and the first augmentation probability of the e-th iteration.

4. The method of claim 1, further comprising:
   acquiring a maximum target weight;
   wherein determining the target weight to be adopted in the (e+1)-th iteration, comprises:
   determining the target weight to be adopted in the (e+1)-th iteration based on the maximum target weight, the maximum quantity of iterations, and the target weight of the e-th iteration.

5. The method of claim 1, wherein determining the target loss function based on the distillation loss function and the truth-value loss function, comprises:
   determining the distillation loss function as the target loss function in a case of the target weight is not less than the maximum target weight or the distillation loss function is not less than the truth-value loss function; and
   determining the truth-value loss function as the target loss function in other cases.

6. The method of claim 1, wherein determining the distillation loss function based on the first output value and the second output value, comprises:
   determining the distillation loss function according to a formula as follow:

$$l1 = (a + a_{df} \times 2/E) \times L_{dist}(o1s, o1t) + (1 - a - a_{df} \times 2/E) \times L_{gt}(o1s, gt);$$

wherein $l1$ represents the distillation loss function, $L_{dist}(o1s, o1t)$ represents a distillation loss value determined according to the first output value and the second output value, $L_{gt}(o1s, gt)$ represents a truth-value loss value determined according to the first output value and a truth-value, a represents the target weight, a dft represents a maximum target weight, E represents the maximum quantity of iterations, gt represents the truth-value, o1s represents the first output value, and o1t represents the second output value.

7. The method of claim 1, wherein determining the truth-value loss function based on the third output value and the fourth output value, comprises:
determining the truth-value loss function according to a formula as follow:

$$l2 = a \times L_{dist}(o2s, o2t) + (1-a) \times L_{gt}(o2s, gt);$$

wherein l2 represents the truth-value loss function, $L_{dist}$(o2s,o2t) represents a distillation loss value determined according to the third output value and the fourth output value, $L_{gt}$(o2s,gt) represents a truth-value loss value determined according to the third output value and a truth-value, a represents the target weight, gt represents the truth-value, o2s represents the third output value, and o2t represents the fourth output value.

8. An image processing method, comprising:
receiving an image to be processed in a target scene; and
inputting the image to be processed into a student model, to acquire a processed result of the image to be processed output by the student model;
wherein the student model is obtained by adopting the lightweight model training method of claim 1.

9. The method of claim 8, wherein receiving the image to be processed in the target scene, comprises at least one of:
acquiring an image to be processed in an image classification scene;
acquiring an image to be processed in an image recognition scene; or
acquiring an image to be processed in a target detection scene.

10. An electronic device, comprising:
at least one processor; and
a memory connected in communication with the at least one processor;
wherein the memory stores an instruction executable by the at least one processor, and the instruction, when executed by the at least one processor, enables the at least one processor to execute operations, comprising:
acquiring a first augmentation probability, a second augmentation probability and a target weight adopted in an e-th iteration, the target weight being a weight of a distillation loss value, e being a positive integer not greater than E, and E being a maximum quantity of iterations and being a positive integer greater than 1;
performing data augmentation on a data set based on the first augmentation probability and the second augmentation probability respectively, to obtain a first data set and a second data set;
obtaining a first output value of a student model and a second output value of a teacher model based on the first data set;
obtaining a third output value of the student model and a fourth output value of the teacher model based on the second data set, and the student model being a lightweight model;
determining a distillation loss function based on the first output value and the second output value;
determining a truth-value loss function based on the third output value and the fourth output value;
determining a target loss function based on the distillation loss function and the truth-value loss function;
training the student model based on the target loss function; and
determining a first augmentation probability or target weight to be adopted in an (e+1)-th iteration in a case of e is less than E.

11. The electronic device of claim 10, wherein the operations further comprise:
acquiring a maximum augmentation probability; and
determining the second augmentation probability based on the maximum augmentation probability, the maximum quantity of iterations and the first augmentation probability.

12. The electronic device of claim 11, wherein determining the first augmentation probability to be adopted in the (e+1)-th iteration, comprises:
determining the first augmentation probability to be adopted in the (e+1)-th iteration based on the maximum augmentation probability, the maximum quantity of iterations and the first augmentation probability of the e-th iteration.

13. The electronic device of claim 10, wherein the operations further comprise:
acquiring a maximum target weight;
wherein determining the target weight to be adopted in the (e+1)-th iteration, comprises:
determining the target weight to be adopted in the (e+1)-th iteration based on the maximum target weight, the maximum quantity of iterations, and the target weight of the e-th iteration.

14. An electronic device, comprising:
at least one processor; and
a memory connected in communication with the at least one processor;
wherein the memory stores an instruction executable by the at least one processor, and the instruction, when executed by the at least one processor, enables the at least one processor to execute operations, comprising:
receiving an image to be processed in a target scene; and
inputting the image to be processed into a student model, to acquire a processed result of the image to be processed output by the student model;
wherein the student model is obtained by adopting the lightweight model training method of claim 1.

15. The electronic device of claim 14, wherein receiving the image to be processed in the target scene, comprises at least one of:
acquiring an image to be processed in an image classification scene;
acquiring an image to be processed in an image recognition scene; or
acquiring an image to be processed in a target detection scene.

16. A non-transitory computer-readable storage medium storing a computer instruction thereon, wherein the computer instruction is used to cause a computer to execute operations, comprising:
acquiring a first augmentation probability, a second augmentation probability and a target weight adopted in an e-th iteration, the target weight being a weight of a distillation loss value, e being a positive integer not greater than E, and E being a maximum quantity of iterations and being a positive integer greater than 1;
performing data augmentation on a data set based on the first augmentation probability and the second augmentation probability respectively, to obtain a first data set and a second data set;

obtaining a first output value of a student model and a second output value of a teacher model based on the first data set;

obtaining a third output value of the student model and a fourth output value of the teacher model based on the second data set, and the student model being a lightweight model;

determining a distillation loss function based on the first output value and the second output value;

determining a truth-value loss function based on the third output value and the fourth output value;

determining a target loss function based on the distillation loss function and the truth-value loss function;

training the student model based on the target loss function; and determining a first augmentation probability or target weight to be adopted in an (e+1)-th iteration in a case of e is less than E.

17. The storage medium of claim 16, wherein the operations further comprise:

acquiring a maximum augmentation probability; and determining the second augmentation probability based on the maximum augmentation probability, the maximum quantity of iterations and the first augmentation probability.

18. The storage medium of claim 17, wherein determining the first augmentation probability to be adopted in the (e+1)-th iteration, comprises:

determining the first augmentation probability to be adopted in the (e+1)-th iteration based on the maximum augmentation probability, the maximum quantity of iterations and the first augmentation probability of the e-th iteration.

19. A non-transitory computer-readable storage medium storing a computer instruction thereon, wherein the computer instruction is used to cause a computer to execute operations, comprising:

receiving an image to be processed in a target scene; and inputting the image to be processed into a student model, to acquire a processed result of the image to be processed output by the student model;

wherein the student model is obtained by adopting the lightweight model training method of claim 1.

20. The storage medium of claim 19, wherein receiving the image to be processed in the target scene, comprises at least one of:

acquiring an image to be processed in an image classification scene;

acquiring an image to be processed in an image recognition scene; or acquiring an image to be processed in a target detection scene.

* * * * *